(12) United States Patent　Kimura

(10) Patent No.: US 10,451,867 B2
(45) Date of Patent: Oct. 22, 2019

(54) LIGHT SCANNING DEVICE AND LIGHT SCANNING METHOD

(71) Applicant: Yuji Kimura, Tokyo (JP)

(72) Inventor: Yuji Kimura, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 10 days.

(21) Appl. No.: 15/890,688

(22) Filed: Feb. 7, 2018

(65) Prior Publication Data

US 2018/0231767 A1　Aug. 16, 2018

(30) Foreign Application Priority Data

Feb. 14, 2017　(JP) ................................ 2017-025374

(51) Int. Cl.
*G02B 26/10*　(2006.01)
*G02B 26/08*　(2006.01)

(52) U.S. Cl.
CPC ....... *G02B 26/101* (2013.01); *G02B 26/0858* (2013.01); *G02B 26/10* (2013.01)

(58) Field of Classification Search
CPC .. G02B 26/0858; G02B 26/10; G02B 26/101; B06B 1/06; B81B 3/00
USPC ..................... 359/199.1, 200.6, 200.7, 200.8
See application file for complete search history.

(56) References Cited

U.S. PATENT DOCUMENTS

| 2003/0015652 A1 | 1/2003 | Kandori et al. |
| 2009/0153933 A1 | 6/2009 | Tsuchiya et al. |
| 2010/0232833 A1* | 9/2010 | Fujii ................ G02B 26/0858 399/130 |
| 2015/0043047 A1* | 2/2015 | Chikaoka ............ G02B 26/101 359/199.3 |
| 2018/0172985 A1 | 6/2018 | Yoshida et al. |

FOREIGN PATENT DOCUMENTS

| EP | 2781949 | 9/2014 | |
| EP | 3367157 A1 * | 8/2018 | ............. G02B 26/10 |
| JP | 2002-365568 | 12/2002 | |
| WO | 2007/146093 | 12/2007 | |
| WO | 2016/194514 | 12/2016 | |

OTHER PUBLICATIONS

Extended European search report for European Patent Application No. 18155981.6 dated Jul. 27, 2018.

* cited by examiner

*Primary Examiner* — Frank G Font
(74) *Attorney, Agent, or Firm* — IPUSA, PLLC

(57) ABSTRACT

A two-dimensional scan type light scanning device is configured to perform oscillation of a mirror in a first direction and a second direction perpendicular to the first direction. The light scanning device includes a second actuating beam causing the oscillation of the mirror in the second direction, a differential calculation unit configured to calculate a difference between a bending amount of the second actuating beam at a time of an initial drive and a bending amount of the second actuating beam after a predetermined period of time, and a phase shift calculation unit configured to calculate an amount of phase shift between a driving signal for oscillating the mirror in the first direction and a signal representing a displacement of the mirror in the first direction, based on the difference.

11 Claims, 9 Drawing Sheets

LIGHT SCANNING DEVICE AND LIGHT SCANNING METHOD

CROSS-REFERENCE TO RELATED APPLICATION

The present application claims priority under 35 U.S.C. § 119 to Japanese Patent Application No. 2017-025374, filed on Feb. 14, 2017, the contents of which are incorporated herein by reference in their entirety.

BACKGROUND OF THE INVENTION

1. Field of the Invention

The present invention relates to a light scanning device and a light scanning method.

2. Description of the Related Art

Conventionally, there is known a light scanning device that projects an image by scanning laser light in two dimensions on the screen. The light scanning device described above is configured to scan the laser light in two dimensions by driving a MEMS (Micro Electro Mechanical Systems) mirror used for reflecting the laser light, and by sequentially changing the reflection direction.

When using a relatively-fast resonant actuation to drive the MEMS mirror in a horizontal direction, a phase difference occurs between the drive signal and the displacement of the MEMS mirror. If such phase difference occurs, distortion occurs in a projected image corresponding to the phase difference in the horizontal scanning direction. Therefore, conventionally, a technique has been proposed to eliminate the phase shift in the horizontal scanning direction (refer to Patent Document 1 for example).

CITATION LIST

Patent Document

[Patent Document 1] Japanese Unexamined Patent Application Publication No. 2002-365568.

SUMMARY OF THE INVENTION

Technical Problem

It is known that a phase shift in the horizontal scanning direction occurs depending on variation in bending of a vertical beam for driving (oscillating) a MEMS mirror in a vertical direction, even if temperature is constant. As the variation in the bending is reversible, bending state of the vertical beam reverts to an initial state when the MEMS mirror stops driving. Thus, a phase shift in the horizontal scanning direction occurs even from bending alone.

However, the effect of the phase shift caused by the bending is not considered in the technique disclosed in the Patent Document 1. Therefore it is difficult in the conventional technique to improve accuracy of compensation of a phase shift in the horizontal scanning direction.

The present invention is made in light of the above problem, and aims at improving accuracy of compensation of a phase shift in the horizontal scanning direction.

Solution to Problem

According to an aspect of the present invention, there is provision for a two-dimensional scan type light scanning device (1) performing oscillation of a mirror (110) in a first direction and a second direction perpendicular to the first direction. The light scanning device includes a second actuating beam (170A, 170B) causing the oscillation of the mirror in the second direction, a differential calculation unit (55) configured to calculate a difference between a bending amount of the second actuating beam (170A, 170B) at a time of an initial drive and a bending amount of the second actuating beam (170A, 170B) after a predetermined period of time, and a phase shift calculation unit (56) configured to calculate an amount of phase shift between a driving signal for oscillating the mirror (110) in the first direction and a signal representing a displacement of the mirror (110) in the first direction, based on the difference.

It should be noted that reference symbols in the above parentheses are provided in order to facilitate easy understanding and simply represent examples, and the present invention is not limited to aspects illustrated in the drawings.

Advantageous Effect of Invention

According to an aspect of the present invention, it is possible to improve accuracy of compensation of a phase shift in the horizontal scanning direction.

DETAILED DESCRIPTION OF THE PREFERRED EMBODIMENTS

First Embodiment

Figure 1:
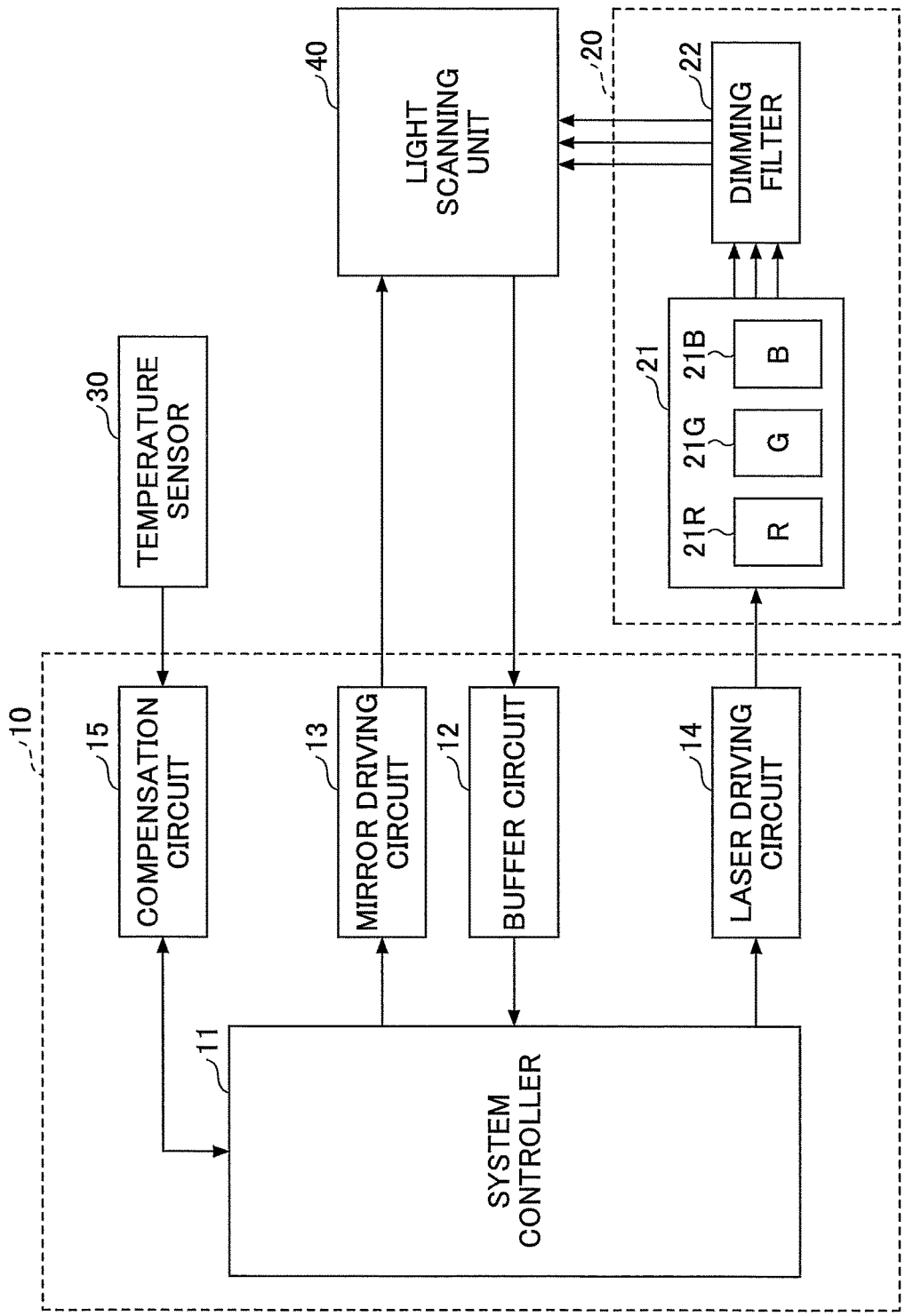
FIG. 1 is a diagram illustrating a configuration of a light scanning device according to a first embodiment.

In the following, a first embodiment of the present disclosure will be described with reference to the drawings. FIG. 1 is a diagram illustrating a configuration of a light scanning device according to the first embodiment.

The light scanning device according to the present embodiment includes a light scanning control unit 10, a light source 20, a temperature sensor 30, and a light scanning unit 40. Details of each component will be described below.

The light scanning control unit 10 according to the present embodiment controls the light source 20 and the light scanning unit 40. The light scanning control unit 10 includes a system controller 11, a buffer circuit 12, a mirror driving circuit 13, a laser driving circuit 14, and a compensation circuit 15.

The system controller 11 provides the mirror driving circuit 13 with a control signal for controlling oscillation of a mirror in the light scanning unit 40. The system controller 11 also provides the laser driving circuit 14 with a digital image signal.

The buffer circuit 12 retains data that is output from the light scanning unit 40. Specifically, the buffer circuit 12 retains, for example, signals that are output from a vertical oscillating angle sensor and a horizontal oscillating angle sensor included in the light scanning unit 40.

The mirror driving circuit 13 provides the light scanning unit 40 with a horizontal driving signal and a vertical driving signal, based on the control signal from the system controller 11. The horizontal driving signal is a signal for causing an oscillation of a mirror (described below) in a horizontal direction (first direction), and the vertical driving signal is a signal for causing an oscillation of the mirror in a vertical direction (second direction).

The laser driving circuit 14 provides the light source 20 with a laser driving signal for driving a laser, based on an image signal from the system controller 11.

The compensation circuit 15 compensates a phase shift in the horizontal scanning direction that is caused by variation in bending of an actuating beam for driving a mirror in a vertical direction. Hereinafter, the horizontal scanning direction may be referred to as a "horizontal direction". The phase shift in the horizontal direction is a phase difference between a horizontal driving signal provided for the light scanning unit 40 and a horizontal displacement of the mirror (an output signal that is output by the horizontal oscillating angle sensor based on a horizontal displacement of the mirror). Details of the compensation circuit 15 will be described below.

The light source 20 according to the present embodiment includes an LD module 21 and a dimming filter 22. The LD module 21 includes a laser 21R, a laser 21G, and a laser 21B.

The lasers 21R, 21G, and 21B emit laser lights based on laser driving current provided by the system controller 11. The laser 21R is, for example, a red semiconductor laser, and emits light with a wavelength λR (e.g., 640 nm). The laser 21G is, for example, a green semiconductor laser, and emits light with a wavelength λG (e.g., 530 nm). The laser 21B is, for example, a blue semiconductor laser, and emits light with a wavelength λB (e.g., 445 nm). The light beams with respective wavelengths emitted from the lasers 21R, 21G, and 21B are combined by a dichroic mirror and the like, luminous energy of the combined light is decreased to a predetermined amount by the dimming filter 22, and the dimmed light enters the light scanning unit 40.

The temperature sensor 30 is a sensor used for detecting a temperature of the surroundings of the light scanning device 1. The temperature sensor 30 may be implemented by a thermistor.

The light scanning unit 40 drives the mirror in the horizontal and the vertical directions in accordance with the horizontal driving signal and the vertical driving signal provided by the mirror driving circuit 13. In accordance with these signals, the light scanning unit 40 alters a reflecting direction of a laser light, performs scanning using the laser light, and projects images on a screen or the like.

Figure 2:
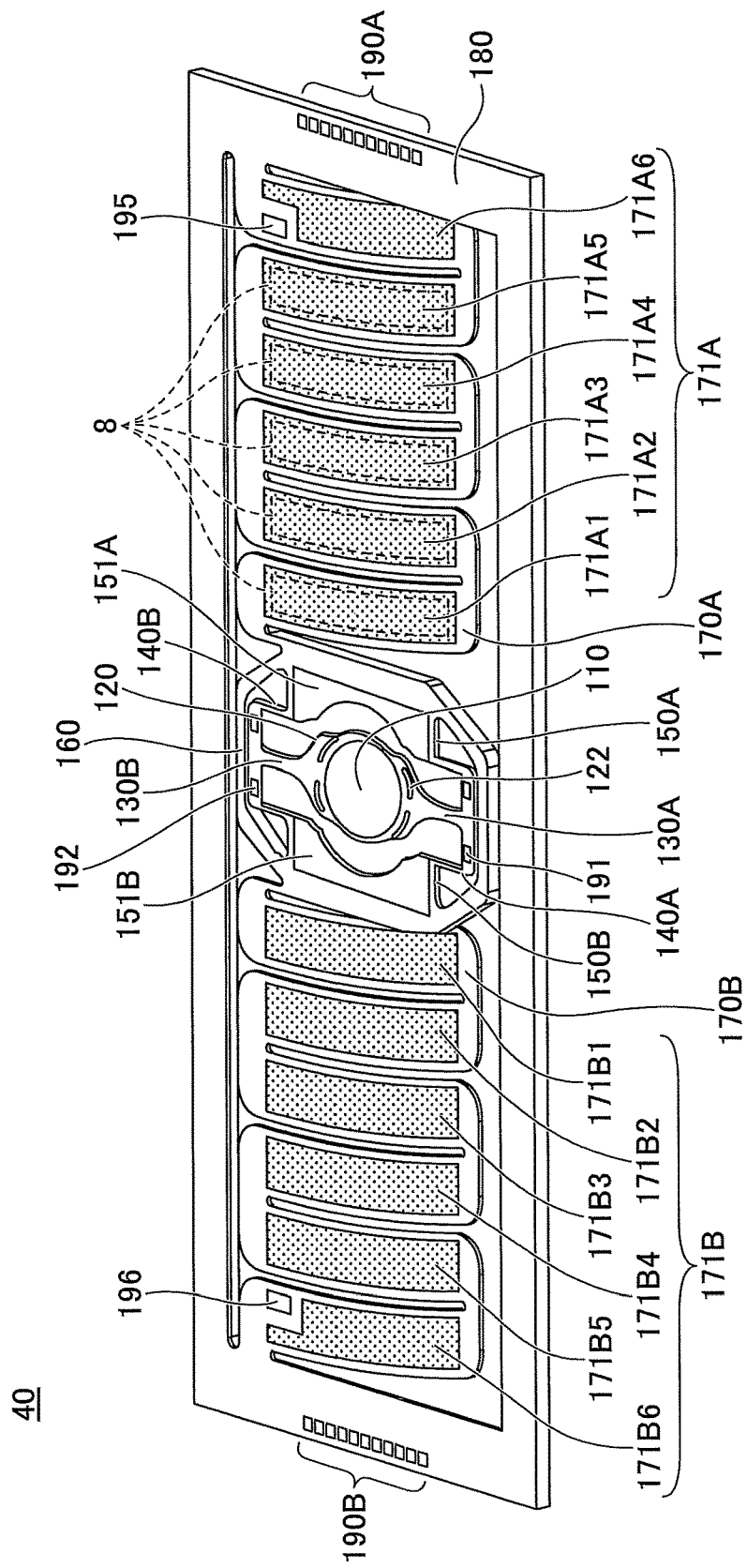
FIG. 2 is a diagram illustrating a light scanning unit according to the first embodiment.

In the following, the light scanning unit 40 will be further described with reference to FIG. 2. FIG. 2 is a diagram illustrating the light scanning unit according to the first embodiment.

The light scanning unit 40 according to the present embodiment is, for example, a MEMS (Micro Electro Mechanical Systems) mirror that drives a mirror 110 by a piezoelectric element.

The light scanning unit 40 includes the mirror 110, a mirror support 120, torsion beams 130A and 130B, connecting beams 140A and 140B, first actuating beams 150A and 150B, a movable frame 160, second actuating beams 170A and 170B, and a fixed frame 180. The first actuating beams 150A and 150B respectively include an actuation source 151A and an actuation source 151B. Also, the second actuating beams 170A and 170B respectively include actuation sources 171A and actuation sources 171B. A set of the first actuating beams 150A and 150B and a set of the second actuating beams 170A and 170B act as actuators for causing horizontal and vertical oscillation of the mirror 110.

Slits 122 are formed on the mirror support 120 along a circumference of the mirror 110. Because the slits 122 are formed, the mirror support 120 is reduced in weight, and torsion of the torsion beams 130A and 130B can be transmitted to the mirror 110.

The mirror 110 is supported on an upper surface of the mirror support 120 in the light scanning unit 40. Both sides of the mirror support 120 are respectively connected to an end portion of the torsion beam 130A and an end portion of the torsion beam 130B. The torsion beams 130A and 130B construct an oscillating axis of the mirror 110, extend along the axis, and thereby support the mirror support 120 from both sides in the axial direction. By torsion of the torsion beams 130A and 130B, the mirror 110 supported by the mirror support 120 oscillates. By the oscillation of the mirror 110, the mirror 110 performs scanning of laser light emitted on the mirror 110. The torsion beams 130A and 130B are respectively connected to the connecting beams 140A and 140B, and thereby are linked to the first actuating beams 150A and 150B.

The first actuating beams 150A and 150B, the connecting beams 140A and 140B, the torsion beams 130A and 130B, the mirror support 120, and the mirror 110 are supported by the movable frame 160 from outside. One side of the respective first actuating beams 150A and 150B is supported by the movable frame 160. The other side of the first actuating beam 150A extends inside, and is connected to the connecting beams 140A and 140B. Similarly, the other side of the first actuating beam 150B extends inside, and is connected to the connecting beams 140A and 140B.

The first actuating beams 150A and 150B are arranged in a direction perpendicular to the axis constructed by the torsion beams 130A and 130B, such that the mirror 110 and the mirror support 120 are placed between the first actuating beam 150A and the first actuating beam 150B. On upper surfaces of the first actuating beams 150A and 150B, the actuation source 151A and the actuation source 151B are provided respectively. The actuation source 151A and the actuation source 151B respectively include an upper electrode formed on a thin film made of a piezoelectric element on an upper surface of the first actuating beams 150A and 150B (hereinafter, a thin film made of a piezoelectric element is referred to as a "piezoelectric thin film"). Also, the actuation source 151A and the actuation source 151B respectively include a lower electrode at a lower surface of the piezoelectric thin film. The first actuating beams 150A and 150B expand and contract in accordance with polarity of a drive voltage applied across the upper electrode and the lower electrode.

Hence, if different drive voltages having different (inverted) phases are applied to each of the first actuating beams 150A and 150B, the first actuating beams 150A and 150B vibrate alternately upward and downward. Accordingly, the mirror 110 can oscillate around the axis constructed by the torsion beams 130A and 130B.

Hereinafter, the direction in which the mirror 110 oscillates around the axis constructed by the torsion beams 130A and 130B is referred to as a "horizontal direction". That is, the first actuating beams 150A and 150B according to the present embodiment cause the mirror 110 to oscillate in the horizontal direction (the first direction) by a torsional deformation of the torsion beams 130A and 130B. For example, a resonant vibration mode is used by the horizontal oscillation of the first actuating beams 150A and 150B, to drive (oscillate) the mirror 110 quickly.

At outer circumference of the movable frame 160, one end of the second actuating beam 170A and one end of the second actuating beam 170B are connected. The second actuating beams 170A and 170B are arranged in a direction perpendicular to the axis constructed by the torsion beams 130A and 130B, such that the movable frame 160 is placed between the second actuating beams 170A and 170B. The second actuating beams 170A and 170B support the movable frame 160 from both sides, and cause the movable frame 160 to oscillate around an axis passing through a center of a surface of the mirror 110. The second actuating beam 170A is formed of multiple rectangular beams (for example, an even number of rectangular beams) arranged side by side in parallel with the first actuating beam 150A. Further, since one end of each rectangular beam is connected (linked) to an end of one of two adjacent rectangular beams, with the other end of the rectangular beam being connected (linked) to an end of the other of the two adjacent rectangular beams, the second actuating beam 170A has a zigzag shape as a whole.

The other end of the second actuating beam 170A is connected to inner circumference of the fixed frame 180. Similarly, the second actuating beam 170B is formed of multiple rectangular beams (for example, an even number of rectangular beams) arranged side by side in parallel with the first actuating beam 150B. Further, since one end of each rectangular beam is connected (linked) to an end of one of two adjacent rectangular beams, with the other end of the rectangular beam being connected (linked) to an end of the other of the two adjacent rectangular beams, the second actuating beam 170B has a zigzag shape as a whole. Further, the other end of the second actuating beam 170B is connected to the inner circumference of the fixed frame 180.

On an upper surface of the second actuating beam 170A, the actuation sources 171A are formed on each rectangular beam (not including curved portions) constituting the second actuating beam 170A. Similarly, on an upper surface of the second actuating beam 170B, the actuation sources 171B are formed on each rectangular beam constituting the second actuating beam 170B. The actuation source 171A includes an upper electrode on a piezoelectric thin film formed on an upper surface of the second actuating beam 170A, a stress counter film 8 formed on an upper surface of the piezoelectric thin film, and a lower electrode formed at a lower surface of the piezoelectric thin film. The actuation source 171B includes an upper electrode on a piezoelectric thin film formed on an upper surface of the second actuating beam 170B, a stress counter film 8 formed on an upper surface of the piezoelectric thin film, and a lower electrode formed at a lower surface of the piezoelectric thin film.

It should be noted that the stress counter film 8 is not provided on a region on which a piezoelectric thin film is not formed. The reason is that, if the stress counter film 8 is provided on a region on which a piezoelectric thin film is not formed, stress is applied on the region where stress need not be generated, which would cause deformation or damage of the light scanning unit 40.

In the present embodiment, in an initial state, the light scanning unit 40 is configured such that the second actuating beams 170A and 170B bend downward relative to the fixed frame 180, by the stress counter film 8 applying compressive stress to the second actuating beams 170A and 170B, as illustrated in FIG. 2 for example. Note that the compressive stress is stress to bend the second actuating beams 170A and 170B downward relative to the fixed frame 180. Further, the initial state means a state that driving signals are not supplied to the light scanning unit 40.

As the second actuating beams 170A and 170B bend downward in the initial state of the light scanning unit 40 illustrated in FIG. 2, if the second actuating beams 170A and 170B are actuated to bend upward, the second actuating beams 170A and 170B do not bend upward relative to the fixed frame 180 (or do not bend upward easily). Such structure of the light scanning unit 40 can reduce occurrence of damage or fatigue of material, as compared to a light scanning unit not having bending in the second actuating beams 170A and 170B.

Note that the second actuating beams 170A and 170B bend downward because of the compressive stress applied to the second actuating beams 170A and 170B, even in the state in which voltage is not applied to the actuation sources 171A and 171B and in which the mirror 110 is not moving.

To each of the rectangular beams in the second actuating beams 170A and 170B, drive voltage having different polarity from that applied to an adjacent rectangular beam is applied. By this voltage applying method, each of the rectangular beams in the second actuating beams 170A and 170B bends in a different direction from the adjacent rectangular beam, and accumulated vertical displacement from each of the rectangular beams is propagated to the movable frame 160.

Because the second actuating beams 170A and 170B are actuated as mentioned above, the second actuating beams 170A and 170B cause the mirror 110 to oscillate in a vertical direction (note that a direction perpendicular to the horizontal direction (mentioned above) is referred to as the "vertical direction"). That is, the second actuating beams 170A and 170B are vertical beams for causing the mirror 110 to oscillate in the vertical direction. In other words, the second actuating beams 170A and 170B in the present embodiment cause the mirror 110 to oscillate in the vertical direction (second direction) through their bending deformation. For example, non-resonant vibration mode may be used for the vertical actuation of the second actuating beams 170A and 170B.

Suppose that the actuation sources 171A include actuation sources 171A1, 171A2, 171A3, 171A4, 171A5, and 171A6, which are aligned on the right side of the movable frame 160. Similarly, suppose that the actuation sources 171B include actuation sources 171B1, 171B2, 171B3, 171B4, 171B5, and 171B6, which are aligned on the left side of the movable frame 160. If the actuation sources 171A1, 171B1, 171A3, 171B3, 171A5, and 171B5 are driven by applying voltage having the same waveform, and if the actuation sources 171A2, 171B2, 171A4, 171B4, 171A6, 171B6 are driven by applying voltage having different waveform from that applied to the actuation sources 171A1 and the like, the mirror 110 oscillates in a vertical direction.

Drive wiring for applying a drive voltage to the upper electrode and the lower electrode of the actuation source 151A is connected to a predetermined terminal which is one of terminals 190A provided on the fixed frame 180. Also, drive wiring for applying a drive voltage to the upper electrode and the lower electrode of the actuation source 151B is connected to a predetermined terminal which is one of terminals 190B provided on the fixed frame 180. Drive wiring for applying a drive voltage to the upper electrode and the lower electrode of the actuation source 171A is connected to a predetermined terminal which is one of the terminals 190A provided on the fixed frame 180. Also, drive wiring for applying a drive voltage to the upper electrode and the lower electrode of the actuation source 171B is connected to a predetermined terminal which is one of the terminals 190B provided on the fixed frame 180.

The light scanning unit 40 also includes piezoelectric sensors 191 and 192 used as the horizontal oscillating angle sensors for detecting slope in the horizontal direction (horizontal oscillating angle) of the mirror 110 while the mirror 110 is oscillating in the horizontal direction by a drive voltage applied to the actuation sources 151A and 151B. The piezoelectric sensor 191 is provided on the connecting beam 140A, and the piezoelectric sensor 192 is provided on the connecting beam 140B.

Further, the light scanning unit 40 also includes piezoelectric sensors 195 and 196 used as the vertical oscillating angle sensors for detecting slope in the vertical direction (vertical oscillating angle) of the mirror 110 while the mirror 110 is oscillating in the vertical direction by a drive voltage applied to the actuation sources 171A and 171B. The piezoelectric sensor 195 is provided on one of the rectangular beams included in the second actuating beam 170A, and the piezoelectric sensor 196 is provided on one of the rectangular beams included in the second actuating beam 170B.

The piezoelectric sensor 191 outputs a voltage corresponding to a displacement of the connecting beam 140A which is caused by a horizontal incline of the mirror 110 transmitted via the torsion beam 130A. The piezoelectric sensor 192 outputs a voltage corresponding to a displacement of the connecting beam 140B which is caused by a horizontal incline of the mirror 110 transmitted via the torsion beam 130B. The piezoelectric sensor 195 outputs a voltage corresponding to a displacement of one of the rectangular beams included in the second actuating beam 170A on which the piezoelectric sensor 195 is provided, which is caused by a vertical incline of the mirror 110. The piezoelectric sensor 196 outputs a voltage corresponding to a displacement of one of the rectangular beams included in the second actuating beam 170B on which the piezoelectric sensor 196 is provided, which is caused by a vertical incline of the mirror 110.

In the present embodiment, a vertical incline of the mirror 110 is detected using outputs of the piezoelectric sensors 195 and 196. The voltage information output by the piezoelectric sensors 195 and 196 is retained by the buffer circuit 12. Note that only one voltage information output by one of the piezoelectric sensors 195 and 196 may be retained in the buffer circuit 12.

In the present embodiment, the compensation circuit 15 compensates for emission timing of the laser light from the light source 20, based on the voltage information retained in the buffer circuit 12.

Each of the piezoelectric sensors 191, 192, 195, and 196 includes an upper electrode on a piezoelectric thin film, and a lower electrode formed at a lower surface of the piezoelectric thin film. In the present embodiment, an output of each of the piezoelectric sensors is a voltage between the upper electrode and the lower electrode.

Sensor wires drawn from the upper electrode and the lower electrode of the piezoelectric sensor 191 are connected to a predetermined terminal which is one of the terminals 190B provided on the fixed frame 180. Sensor wires drawn from the upper electrode and the lower electrode of the piezoelectric sensor 195 are connected to a predetermined terminal which is one of the terminals 190A provided on the fixed frame 180. Sensor wires drawn from the upper electrode and the lower electrode of the piezoelectric sensor 192 are connected to a predetermined terminal which is one of the terminals 190B provided on the fixed frame 180. Sensor wires drawn from the upper electrode and the lower electrode of the piezoelectric sensor 196 are connected to a predetermined terminal which is one of the terminals 190B provided on the fixed frame 180.

Figure 3:
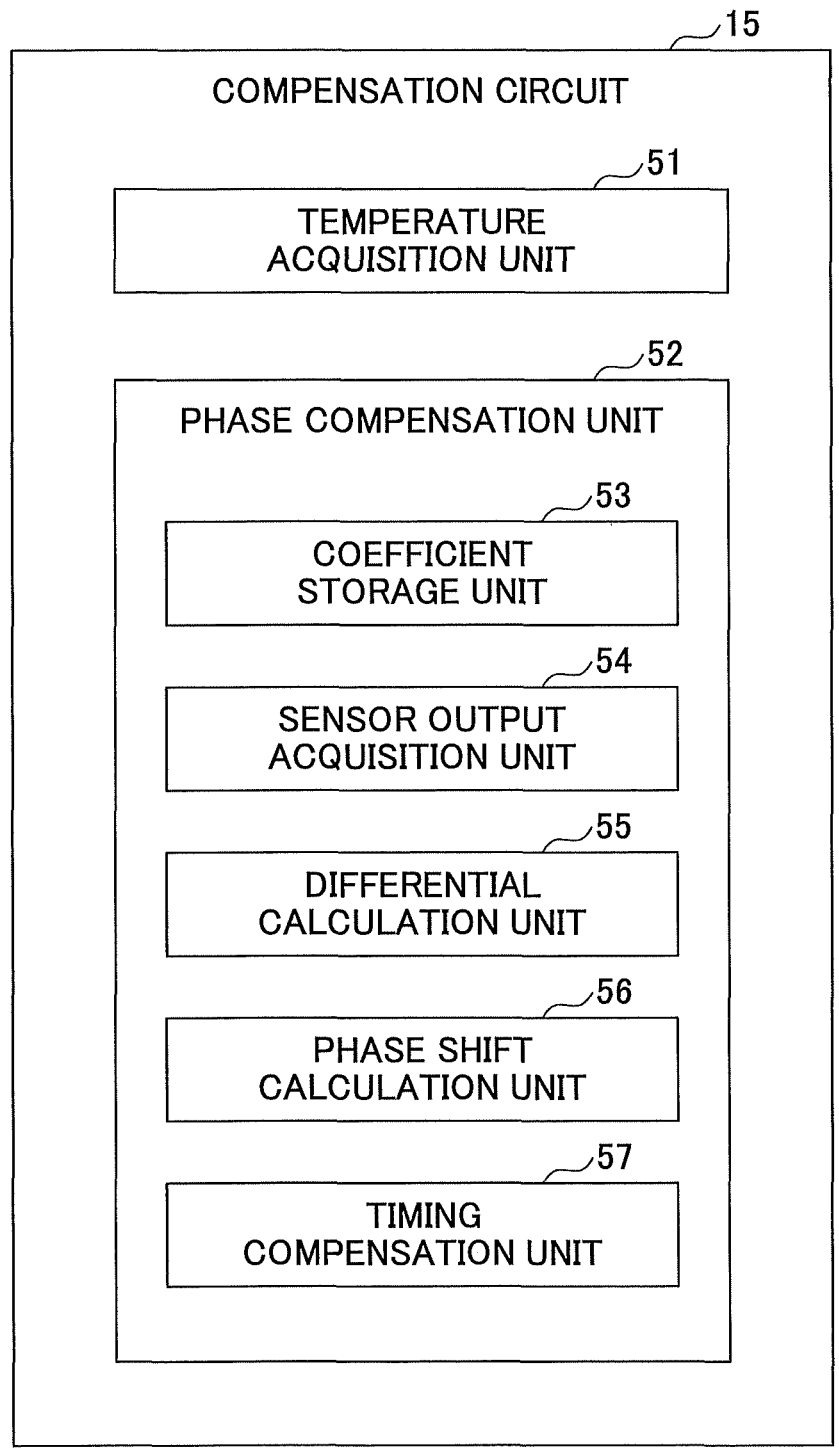
FIG. 3 is a diagram illustrating a function of a compensation circuit according to the first embodiment.

Next, a function of the compensation circuit 15 will be described with reference to FIG. 3. FIG. 3 is a diagram illustrating the function of the compensation circuit according to the first embodiment.

The compensation circuit 15 according to the present embodiment includes a temperature acquisition unit 51 and a phase compensation unit 52. The temperature acquisition unit 51 according to the present embodiment acquires temperature detected by the temperature sensor 30.

The phase compensation unit 52 includes a coefficient storage unit 53, a sensor output acquisition unit 54, a differential calculation unit 55, a phase shift calculation unit 56, and a timing compensation unit 57.

The coefficient storage unit 53 stores coefficients of a formula defining a function representing a relation between bending amounts of the second actuating beam 170A or 170B and temperature. The coefficient storage unit 53 also stores coefficients of a formula defining a function representing a relation between variation of bending amounts and an amount of phase shift in the horizontal direction. Details of the function represented by the coefficients stored in the coefficient storage unit 53 will be described below.

The sensor output acquisition unit 54 obtains voltage information retained in the buffer circuit 12. The voltage information retained in the buffer circuit 12 is output signals from the piezoelectric sensors 191, 192, 195, and 196.

The differential calculation unit 55 calculates a difference between a bending amount of the second actuating beam 170A or 170B at a time of an initial drive and a current bending amount of the second actuating beam 170A or 170B, based on the temperature acquired by the temperature acquisition unit 51, the function defined by the coefficients stored in the coefficient storage unit 53, and the output signals acquired by the sensor output acquisition unit 54. The current bending amount of the second actuating beam 170A or 170B is a bending amount for the second actuating beam 170A or 170B in a state in which the second actuating beam 170A or 170B has been actuated for a certain period of time, and the current bending amount of the second actuating beam 170A or 170B is derived from the output signals of the piezoelectric sensors 195 and 196.

The phase shift calculation unit 56 calculates an amount of phase shift in the horizontal direction, based on the difference calculated by the differential calculation unit 55, and the coefficients stored in the coefficient storage unit 53. The amount of phase shift in the horizontal direction corresponds to a compensation amount of timing of emitting laser light.

The timing compensation unit 57 compensates timing of emitting the laser light based on the compensation amount of the timing. Specifically, the timing compensation unit 57 sends the compensation amount of the timing to the system controller 11, to update (modify) a timing to emit the laser light.

In the following, the coefficients stored in the coefficient storage unit 53 will be explained with reference to FIG. 4.

Figure 4:
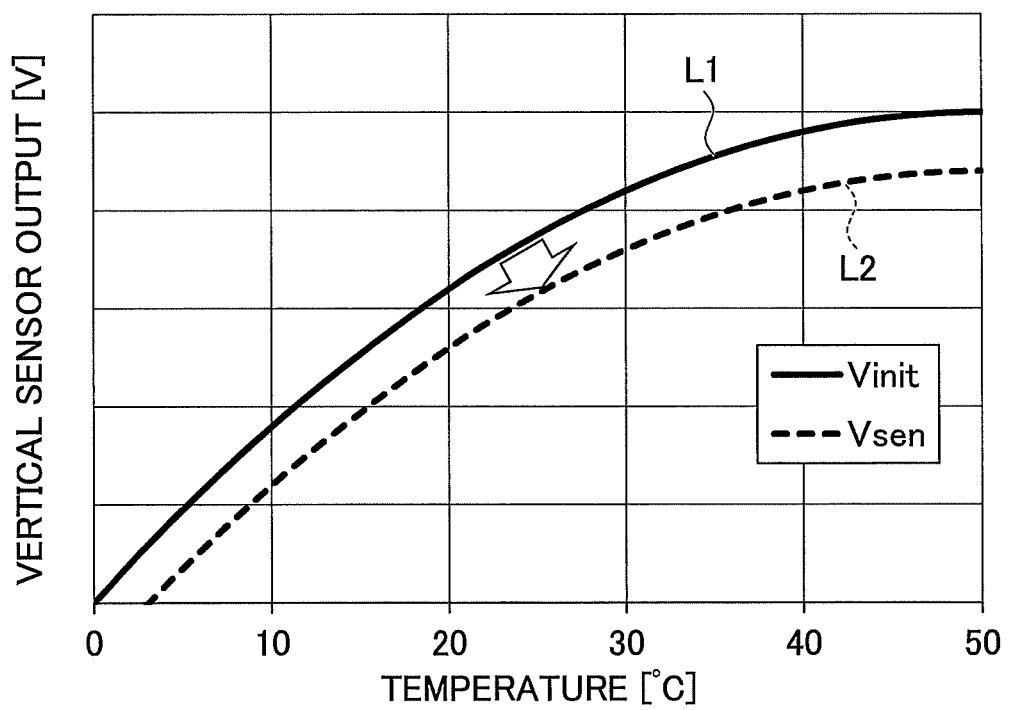
FIG. 4 is a graph representing a relation between bending amounts of second actuating beams and temperature according to the first embodiment.

FIG. 4 is a graph representing a relation between bending amounts of the second actuating beams and temperature according to the first embodiment.

In the graph illustrated in FIG. 4, a horizontal axis represents temperature. And, a vertical axis represents a bending amount of the second actuating beam 170A or 170B. In the present embodiment, output signals (output voltage) of the piezoelectric sensors 195 and 196 are used as values representing bending amounts of the second actuating beam 170A or 170B. Note that, in the following description of the present embodiment, it is assumed that the bending amounts of the second actuating beams 170A and 170B are equal. Also, the vertical axis illustrated in FIG. 4 is represented by an output signal of the piezoelectric sensor 195.

In FIG. 4, a curved line L1 represents a graph of a function Vinit(T) representing a relation between a bending amount (Vinit) and temperature T at a time of an initial drive of the light scanning unit 40. The time of the initial drive is a time when supply of a driving signal to the light scanning unit 40 is started.

Additionally, in FIG. 4, a curved line L2 is a graph of a function Vsen(T) representing a relation between a bending amount (Vsen) and temperature T at a time when a predetermined period of time elapses after the light scanning unit 40 has started driving. The bending amount (Vsen) is a value (voltage) of the output signal obtained from the piezoelectric sensor 195 used as the vertical oscillating angle sensor.

As can be seen from this graph, in the present embodiment, even if temperature is constant, output signal value of the piezoelectric sensor 195 varies as time passes. This variation causes a phase shift in the horizontal direction. Therefore, in the present embodiment, a difference α is calculated between the bending amount at a time of an initial drive with respect to the temperature T obtained by the temperature acquisition unit 51 and the bending amount when a certain period elapses after the time of the initial drive with respect to the temperature T, and based on the difference α, a phase shift in the horizontal direction is calculated.

The function Vinit(T) is expressed by a formula (1) described below. Coefficients a, b, and c are recorded in the coefficient storage unit 53 in advance.

$$V\text{init}(T) = aT^2 + bT + c[V] \quad (1)$$

Note that the function Vinit(T) may be obtained by measuring output signals of the piezoelectric sensor 195 in advance. Specifically, output signals of the piezoelectric sensor 195 at the time of the initial drive of the light scanning unit 40 in a case in which a phase shift in the horizontal direction is zero may be measured by varying temperature T. In the present embodiment, a coefficient β for converting the difference α into an amount of phase shift (in the horizontal direction) is also obtained in advance, and the coefficient β is also stored in the coefficient storage unit 53.

The case in which a phase shift in the horizontal direction is zero means a state in which a phase difference between a horizontal driving signal provided for the light scanning unit 40 and an output signal that is output by the horizontal oscillating angle sensor based on a horizontal displacement of the mirror becomes constant.

Figure 5:
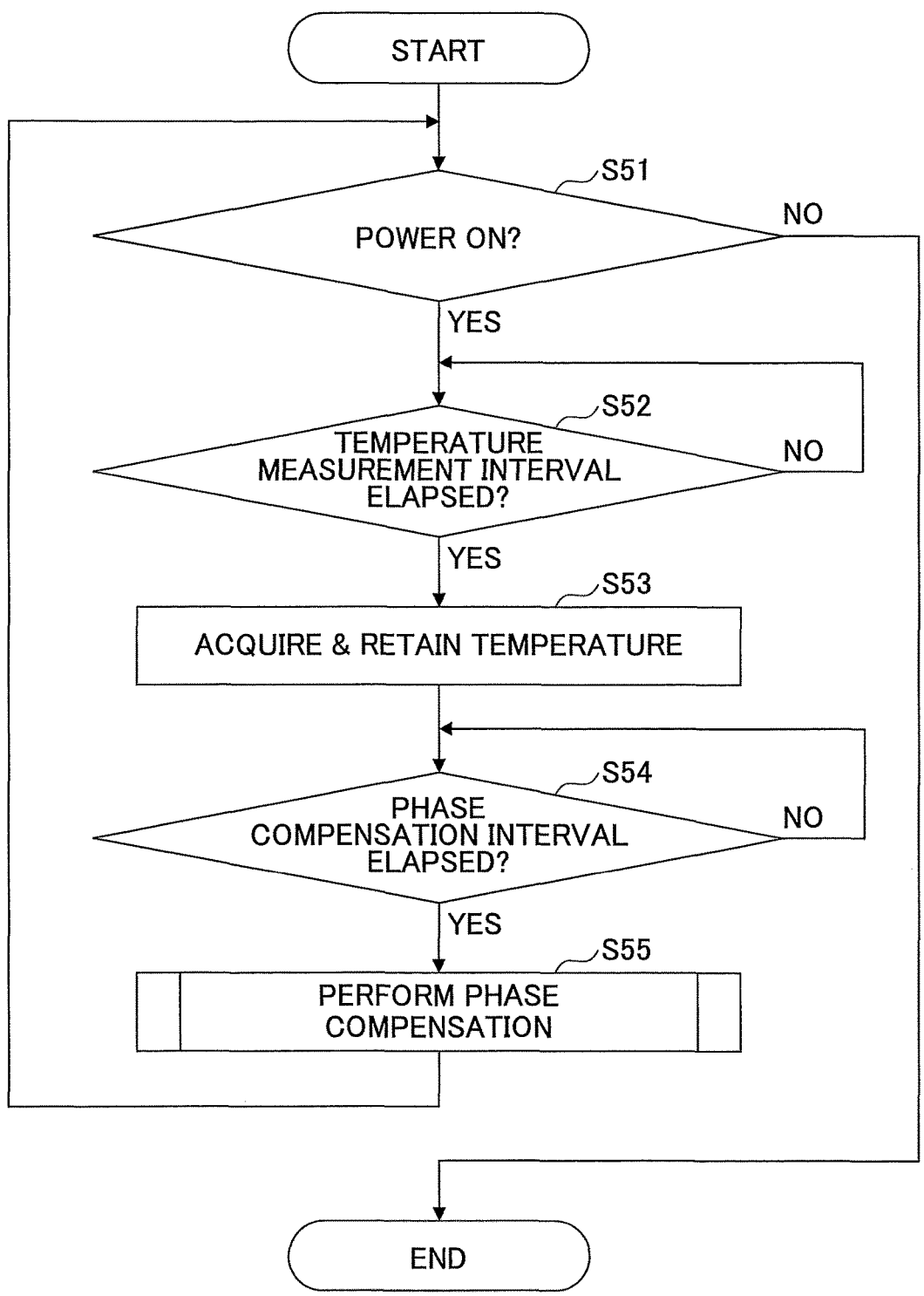
FIG. 5 is a flowchart illustrating an operation of the compensation circuit according to the first embodiment.

Next, an operation of the compensation circuit 15 according to the present embodiment will be described with reference to FIG. 5. FIG. 5 is a flowchart illustrating the operation of the compensation circuit according to the first embodiment.

The compensation circuit 15 according to the present embodiment first checks whether the power of the light scanning device 1 is turned on or not (step S51). If it is determined that the power is off, the compensation circuit 15 terminates the process.

If it is determined that the power is on at step S51, the compensation circuit 15 determines whether a temperature measurement interval has elapsed or not by using the temperature acquisition unit 51 (step S52). The temperature measurement interval may be stored in the temperature acquisition unit 51. When the temperature measurement interval has not elapsed at step S52, the compensation circuit 15 waits until the temperature measurement interval elapses.

When the temperature measurement interval has elapsed at step S52, the temperature acquisition unit 51 acquires temperature detected by the temperature sensor 30, and retains the temperature (step S53).

Next, the temperature acquisition unit 51 determines whether a phase compensation interval has elapsed or not by using the phase compensation unit 52 (step S54). The phase compensation interval may be stored in the phase compensation unit 52. It is preferable that the phase compensation interval is longer than the temperature measurement interval.

When the phase compensation interval has not elapsed at step S54, the compensation circuit 15 waits until the phase compensation interval elapses.

When the phase compensation interval has elapsed at step S54, the temperature acquisition unit 51 performs a process for compensating the phase shift in the horizontal direction by using the phase compensation unit 52 (step S55). After step S55, the process reverts to step S51.

As described above, in the present embodiment, each of the process for acquiring temperature by the temperature acquisition unit 51 and the process for compensating the phase shift by the phase compensation unit 52 is executed independently. Accordingly, in the present embodiment, temperature can be obtained by the temperature acquisition unit 51 at a desired time. For example, the temperature acquisition unit 51 can acquire temperature in synchronization with a process other than a process by the phase compensation unit 52. Therefore in the present embodiment, for example, the acquisition of temperature can be performed more frequently than the process performed by the phase compensation unit 52, only by setting the temperature measurement interval smaller than the phase compensation interval, and thereby to avoid increasing workload of the compensation circuit 15.

Figure 6:
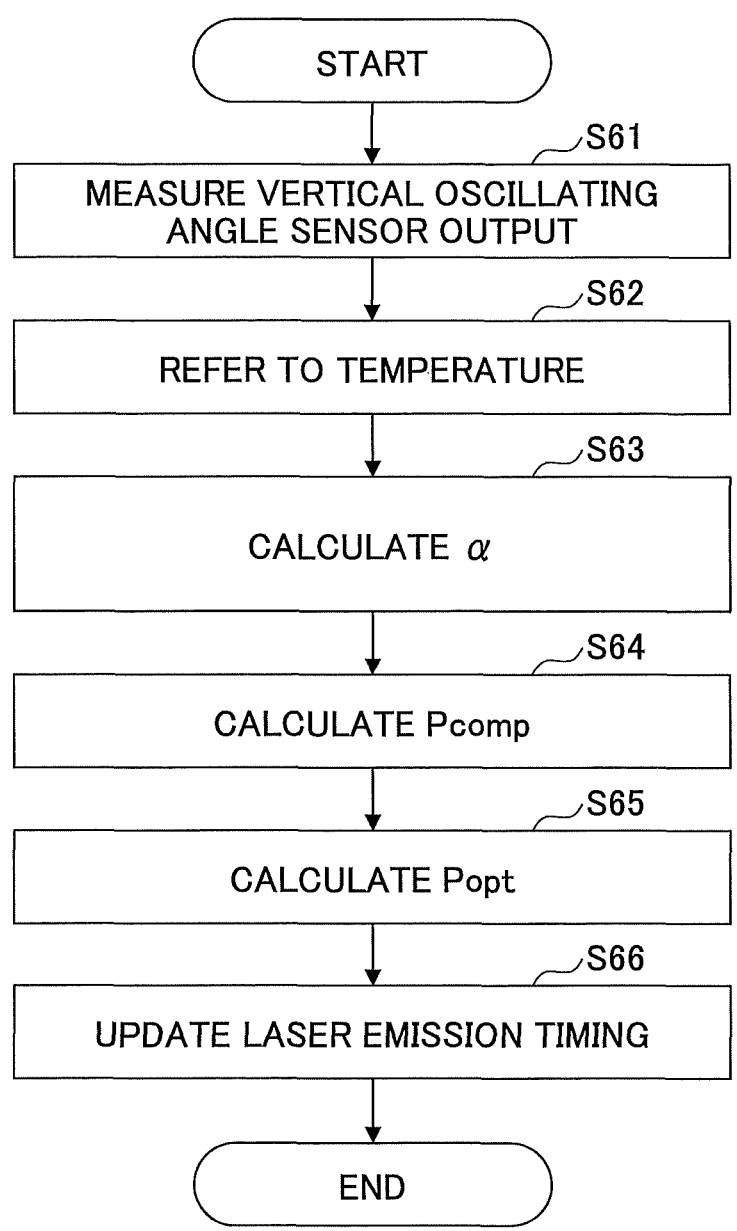
FIG. 6 is a flowchart illustrating an operation of a phase compensation unit according to the first embodiment.

Next, an operation of the phase compensation unit 52 according to the present embodiment will be described with reference to FIG. 6. FIG. 6 is a flowchart illustrating the operation of the phase compensation unit according to the first embodiment.

The phase compensation unit 52 according to the present embodiment acquires, by the sensor output acquisition unit 54, an output signal retained in the buffer circuit 12 (step S61). Next, by using the differential calculation unit 55, the phase compensation unit 52 refers to the temperature retained by the temperature acquisition unit 51 (step S62).

Next, the differential calculation unit 55 calculates a bending amount of the second actuating beam 170A at a time of an initial drive, using the function Vinit(T) represented by the coefficients stored in the coefficient storage unit 53, and the temperature T that was referred to at step S62. Subsequently, the differential calculation unit 55 calculates the difference α between the bending amount of the second actuating beam 170A at the time of the initial drive and the output signal (bending amount) acquired by the sensor output acquisition unit 54 at step S61 (step S63). Note that difference α at temperature of T is calculated based on a following formula (2). Vsen(T) in the formula (2) represents an output signal of the piezoelectric sensor 195 at temperature of T.

$$V\text{sen}(T) = V\text{init}(T) + \alpha \ [V] \qquad (2)$$

Next, the compensation circuit 15 calculates a phase shift in the horizontal direction caused by the difference α, by using the phase shift calculation unit 56 (step S64). In the following, the phase shift amount caused by the difference α is denoted as "Pcomp". The phase shift calculation unit 56 calculates the phase shift amount "Pcomp" using a following formula (3). In the present embodiment, the difference α is converted to a phase shift amount caused by the difference α, based on the formula (3).

$$P\text{comp} = \alpha \times \beta \ [\text{sec}] \qquad (3)$$

Next, the phase shift calculation unit 56 calculates a compensation amount of timing based on the phase shift amount "Pcomp" (step S65). The phase shift calculation unit 56 calculates the compensation amount of timing using a following formula (4). Note that, in the formula (4), the compensation amount of timing is denoted as "Popt" and a phase shift amount at a time of an initial drive is denoted as "Pini".

$$P\text{opt} = P\text{comp} + P\text{ini} \ [\text{sec}] \qquad (4)$$

Next, by using the timing compensation unit 57, the compensation circuit 15 updates (modifies) the timing to emit laser light by the system controller 11, based on the compensation amount of timing (step S66), and terminates the process. The update may be performed, for example, by delaying the timing to emit laser light by the time Popt [sec].

As described above, in the present embodiment, a phase difference between a horizontal driving signal and an output signal of the piezoelectric sensor 191 or 192, caused by variation in bending of the second actuating beam 170A or 170B, can be compensated. Accordingly in the present embodiment, it is possible to improve accuracy of compensation of a phase shift in the horizontal scanning direction.

Also in the present embodiment, a phase difference in the horizontal direction can be compensated by a simple configuration, without adding a dedicated sensor or the like for compensation of phase difference.

Therefore, in the present embodiment, image quality degradation caused by phase difference in the horizontal direction, such as a double vision of a projected image, can be reduced.

Second Embodiment

In the following, a second embodiment will be described. The second embodiment differs from the first embodiment in the following point. A light scanning device according to the second embodiment checks whether bending of an actuating beam for oscillating a mirror in a vertical direction is in a stable state or not. If the bending is in a stable state, the light scanning device performs compensation without using a difference of a bending amount that was used in the first embodiment. In the following description concerning the second embodiment, the difference from the first embodiment is mainly explained. Further, with respect to the elements having similar functions or configurations, the same symbols are attached and the explanation about such elements is omitted.

Figure 7:
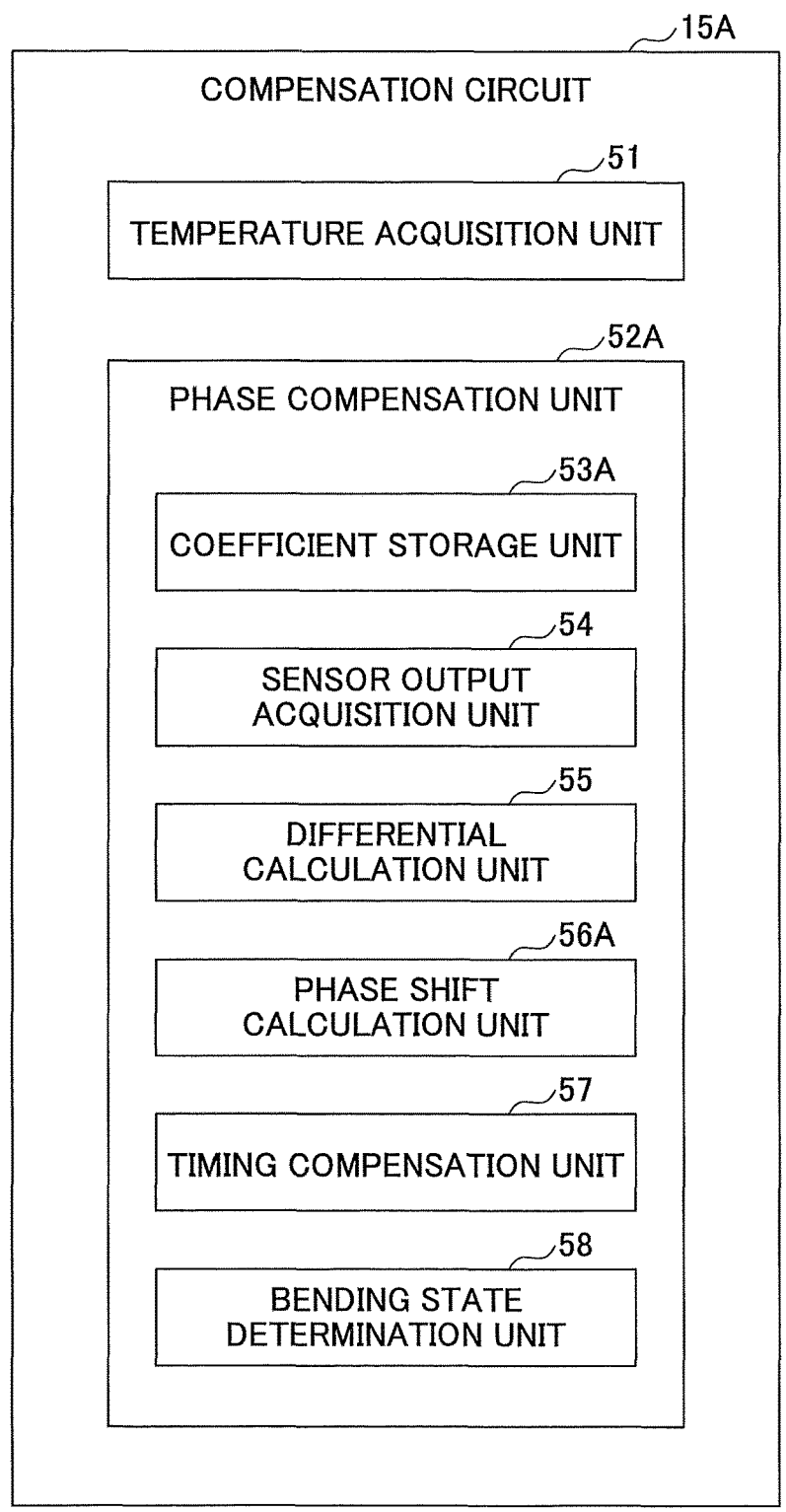
FIG. 7 is a diagram illustrating a function of a compensation circuit according to a second embodiment.

FIG. 7 is a diagram illustrating the function of a compensation circuit according to the second embodiment. A compensation circuit 15A according to the present embodiment includes the temperature acquisition unit 51 and a phase compensation unit 52A.

The phase compensation unit 52A according to the present embodiment includes a coefficient storage unit 53A, the sensor output acquisition unit 54, the differential calculation unit 55, a phase shift calculation unit 56A, the timing compensation unit 57, and a bending state determination unit 58.

In addition to coefficients a, b, c, and p, the coefficient storage unit 53A according to the present embodiment retains coefficients e, f, and g, which are coefficients of a formula defining a function representing a relation between a compensation amount of timing Popt and temperature T. Details of the coefficients e, f, and g will be described below.

When it is determined by the bending state determination unit 58 that bending of the second actuating beam 170A or 170B is in a stable state, the phase shift calculation unit 56A according to the present embodiment calculates a compensation amount of timing Popt by referring to a function (formula (5)) represented by the coefficients e, f, and g.

The bending state determination unit 58 determines whether the bending of the second actuating beam 170A or 170B is in a stable state or not. Specifically, in a case in which output signal value (voltage) of the piezoelectric sensor 195 acquired by the sensor output acquisition unit 54 is equal to the value obtained most recently (previously), the bending state determination unit 58 determines that the state of the bending is stable.

However, a way of determination performed by the bending state determination unit 58 is not limited to the way described above. For example, the bending state determination unit 58 may determine that the state of the bending is stable, when a difference between the output signal value (voltage) of the piezoelectric sensor 195 acquired by the sensor output acquisition unit 54 and output signal value (voltage) of the piezoelectric sensor 195 at a time of an initial drive becomes consistent for a continuous number of times.

Figure 8:
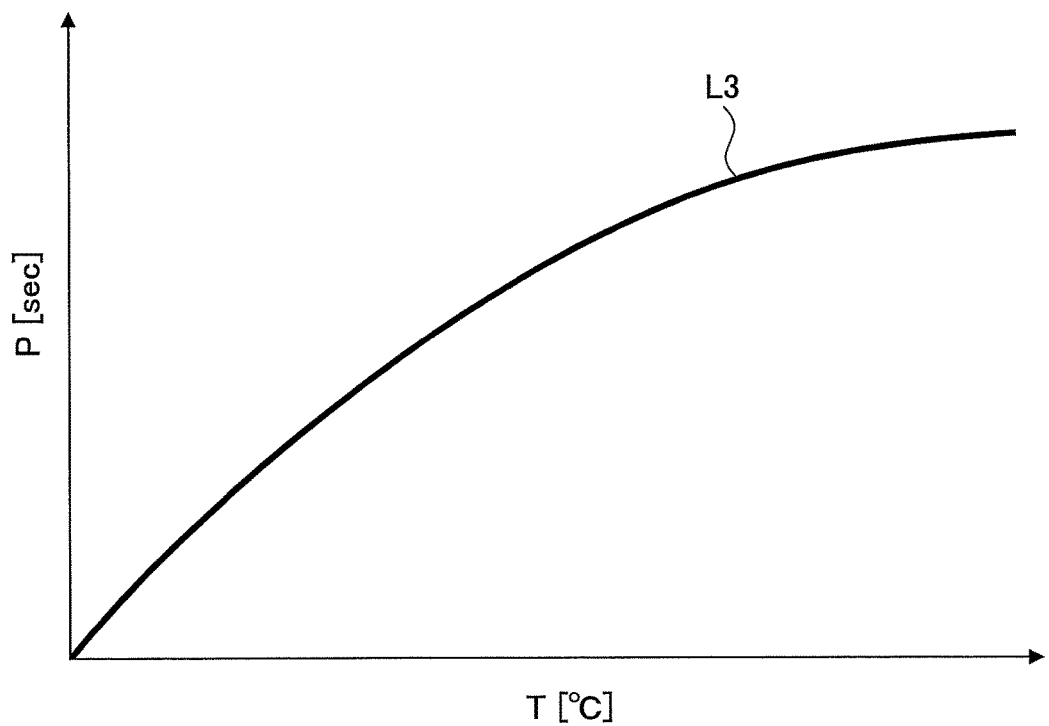
FIG. 8 is a graph representing a relation between a compensation amount of timing and temperature.

In the following, a relation between a compensation amount of timing P and temperature T will be described with reference to FIG. 8. FIG. 8 is a graph representing a relation between a compensation amount of timing and temperature. In the graph illustrated in FIG. 8, a vertical axis represents a compensation amount of timing, and a horizontal axis represents temperature.

A curved line L3 illustrated in FIG. 8 is a graph of a function Pini(T) representing a relation between a compensation amount of timing, at a time of an initial drive of the light scanning unit 40, and temperature T. The function Pini(T) is expressed by a formula (5) described below.

$$P\text{ini}(T) = eT^2 + fT + g \qquad (5)$$

Note that the function Pini(T) may be obtained by measuring/calculating compensation amounts of timing in advance. Specifically, after operating the light scanning unit 40 continuously for a certain period of time to attain a state in which bending of the second actuating beam 170A or 170B is stable, an operation to measure/calculate compensation amounts of timing in a case in which a phase shift in the horizontal direction is zero may be performed by varying temperature T. In the present embodiment, the coefficients e, f, and g may be retained in the coefficient storage unit 53A.

Figure 9:
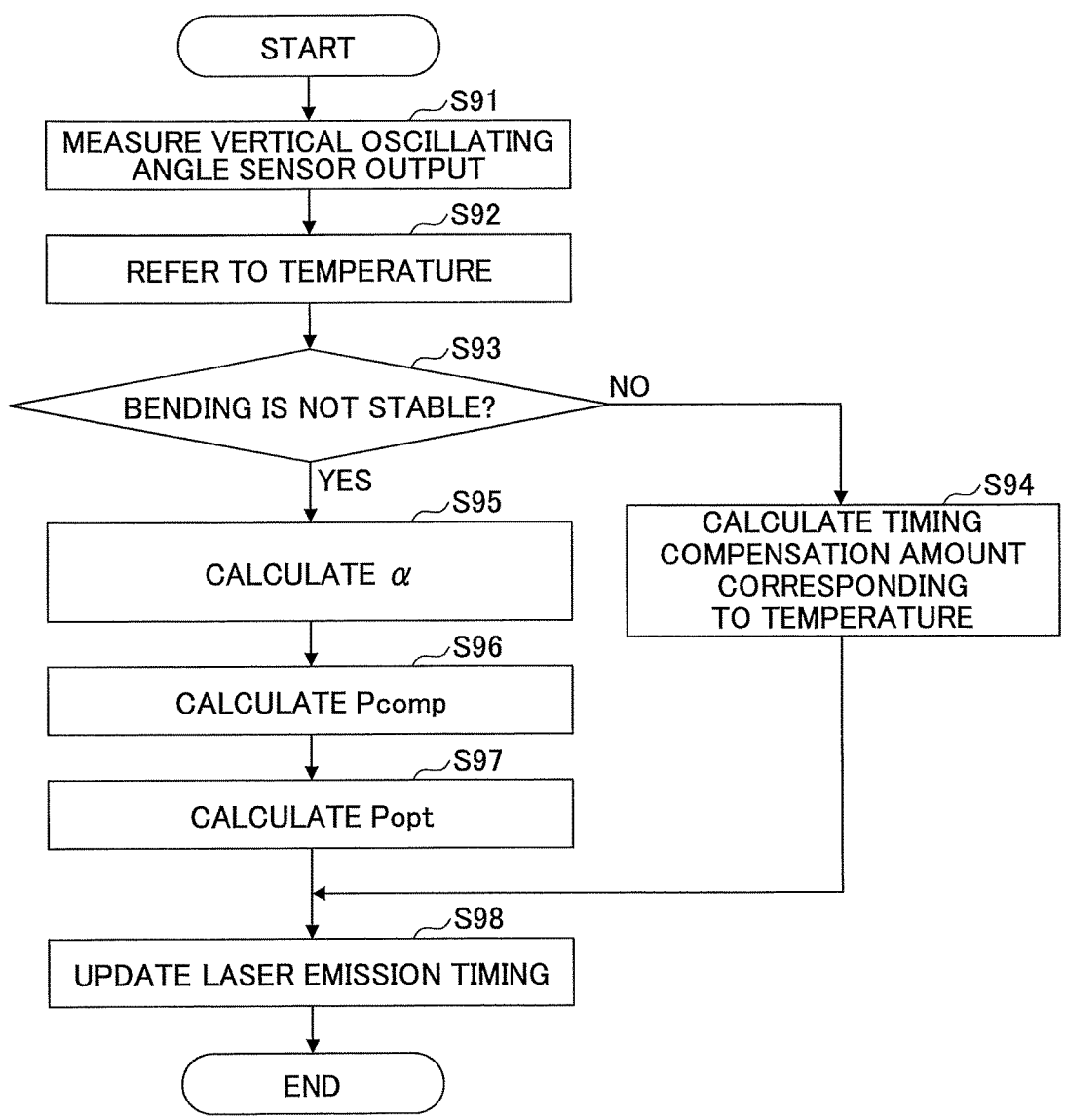
FIG. 9 is a flowchart illustrating an operation of the compensation circuit according to the second embodiment.

Next, an operation of the compensation circuit 15A according to the present embodiment will be described with reference to FIG. 9. FIG. 9 is a flowchart illustrating the operation of the compensation circuit according to the second embodiment.

Processes performed at step S91 and step S92 in FIG. 9 are respectively similar to the processes at step S61 and step S62 in FIG. 6. Therefore, description of these steps is omitted.

Next, by using the bending state determination unit 58, the compensation circuit 15A determines whether bending of the second actuating beam 170A or 170B is in a stable state or not (step S93). The determination method by the bending state determination unit 58 is as described above.

If it is determined, at step S93, that the bending state is stable, the compensation circuit 15A, by using the phase shift calculation unit 56A, refers to the temperature retained by the temperature acquisition unit 51, and calculates a compensation amount of timing Popt' using the function Pini(T) (step S94). After performing step S94, the process proceeds to step S98.

If it is determined, at step S93, that the bending state is not stable, the process proceeds to step S95.

As processes performed at steps S95 to S98 in FIG. 9 are respectively similar to the processes at steps S63 to step S66 in FIG. 6, description of these steps is omitted.

As described above, in the present embodiment, when the bending state is stable, a compensation amount of timing corresponding to temperature can be calculated directly using the function Pini(T). Therefore, a processing workload of the light scanning device can be reduced.

Further, the above described embodiments can be applicable to various light scanning devices of two-dimensional scan type (raster scan type), such as an eyewear and a projector.

Although the present invention has been described with reference to embodiments, the present invention is not limited to these embodiments. Various variations may be made without departing from the scope of the invention, and the variations can be appropriately determined according to application form.

What is claimed is:

1. A two-dimensional scan type light scanning device performing oscillation of a mirror in a first direction and a second direction perpendicular to the first direction, the light scanning device comprising:
   a second actuating beam causing the oscillation of the mirror in the second direction;
   a differential calculation unit configured to calculate a difference between a bending amount of the second actuating beam at a time of an initial drive and a bending amount of the second actuating beam after a predetermined period of time; and
   a phase shift calculation unit configured to calculate an amount of phase shift between a driving signal for oscillating the mirror in the first direction and a signal representing a displacement of the mirror in the first direction, based on the difference calculated by the differential calculation unit.

2. The light scanning device according to claim 1, further comprising an oscillating angle sensor configured to detect an oscillating angle of the mirror in the second direction, the bending amount of the second actuating beam after the predetermined period of time being identified based on an output signal obtained from the oscillating angle sensor.

3. The light scanning device according to claim 1, the phase shift calculation unit being configured to convert the difference calculated by the differential calculation unit into the amount of phase shift by multiplying the difference calculated by the differential calculation unit by a predetermined coefficient.

4. The light scanning device according to claim 1, further comprising a temperature detecting unit, and a coefficient storage unit retaining a first function representing a relation between a temperature and the bending amount of the second actuating beam at the time of the initial drive, wherein the differential calculation unit is configured to, based on the temperature detected by the temperature detecting unit and the first function, calculate the difference at the detected temperature.

5. The light scanning device according to claim 4, further comprising a bending state determination unit configured to determine whether a state of bending of the second actuating beam is stable or not, the coefficient storage unit further retaining a second function representing a relation between the temperature and the amount of phase shift,
   wherein, in response to a determination that the state of the bending of the second actuating beam is stable, the phase shift calculation unit is configured to calculate the difference based on the temperature detected by the temperature detecting unit and the second function.

6. The light scanning device according to claim 1, further comprising:
   a light source configured to emit laser light to the mirror; and
   a timing compensation unit configured to modify timing for emitting the laser light by the light source, based on the amount of phase shift calculated by the phase shift calculation unit.

7. The light scanning device according to claim 1, further comprising a first actuating beam causing the oscillation of the mirror in the first direction,
   the mirror being configured to oscillate in the first direction by a torsional deformation of the first actuating beam, and to oscillate in the second direction by a bending deformation of the second actuating beam.

8. The light scanning device according to claim 7,
   wherein the second actuating beam is formed of multiple rectangular beams arranged side by side in parallel with the first actuating beam,
   the second actuating beam has a zigzag shape as a whole, by both ends of each of the rectangular beams being respectively linked to an end of different adjacent rectangular beams, and
   the mirror is oscillated by a bending deformation of each of the rectangular beams.

9. The light scanning device according to claim 8, further comprising a fixed frame, the mirror being configured to oscillate inside the fixed frame,
   wherein the second actuating beam bends downward relative to the fixed frame at the time of the initial drive.

10. A light scanning method of a two-dimensional scan type light scanning device performing oscillation of a mirror in a first direction and a second direction perpendicular to the first direction, the light scanning device including a second actuating beam causing the oscillation of the mirror in the second direction, the method comprising:
    calculating a difference between a bending amount of the second actuating beam at a time of an initial drive and a bending amount of the second actuating beam after a predetermined period of time; and calculating an amount of phase shift between a driving signal for oscillating the mirror in the first direction and a signal representing a displacement of the mirror in the first direction, based on the calculated difference between the bending amount of the second actuating beam at the time of the initial drive and the bending amount of the second actuating beam after the predetermined period of time.

11. The light scanning method according to claim 10, the light scanning device further comprising a first actuating beam causing the oscillation of the mirror in the first direction, the mirror being configured to oscillate in the first direction by a torsional deformation of the first actuating beam, and to oscillate in the second direction by a bending deformation of the second actuating beam.

\* \* \* \* \*